JAMES F. HAYDEN
INVENTOR.

BY R. Frank Smith
Paul P. Holmes
ATTORNEYS

United States Patent Office 3,322,366
Patented May 30, 1967

3,322,366
AUTOMATIC TAKE-UP CARTRIDGE
James F. Hayden, Rochester, N.Y., assignor to Eastman Kodak Company, Rochester, N.Y., a corporation of New Jersey
Filed Aug. 25, 1965, Ser. No. 482,519
13 Claims. (Cl. 242—71.1)

My invention relates generally to take-up apparatus for strip material, and more particularly to a device for receiving and storing a photographic film.

Film take-up devices have heretofore been devised with a principal emphasis placed on means for maintaining tension on the film to assure uniform winding onto a core. Commonly, devices of this nature have required that a perforated film leader be gripped by the core through means of a catch or tooth before the winding process is begun. Others rely on overlap of film convolutions on the core.

This invention is concerned primarily with cartridge-type automatic take-up devices for flexible strip material particularly of the non-perforated type. The invention could be utilized in conjunction with the winding and reeling of any strip material including motion picture film, magnetic tape, microfilm, cloth etc. The device is particularly useful to receive exposed microfilm being fed from the film unit or picture taking portion of a microfilmer. It is to be understood that the described apparatus can be used with flexible strip material of the perforated or non-perforated type. No manual attachment of the free end of the film to the take-up core in the cartridge is required, as a retractable guide means is provided whereby the film, when inserted through an opening in the cartridge, is guided around a rotatably driven take-up core a sufficient number of times to assure a non-slip friction grip with the surface of the core. The retractable guide is then manually or mechanically retracted, and the driven core continues to wind the film. When the cartridge is removed from its receptacle within the camera, the cartridge opening through which the film was passed is closed in a light-tight manner.

An object of this invention is to provide a device for winding film onto a take-up core.

Another object of this invention is to provide a film take-up cartridge for receiving film and securing the free end of the film to a driven core without manual handling of the film.

A further object of this invention is to provide a take-up cartridge with a light sealing means for the film entrance.

Other objects and advantages of the invention will be apparent from the following description given with relation to the accompanying drawings of which:

Figure 1:
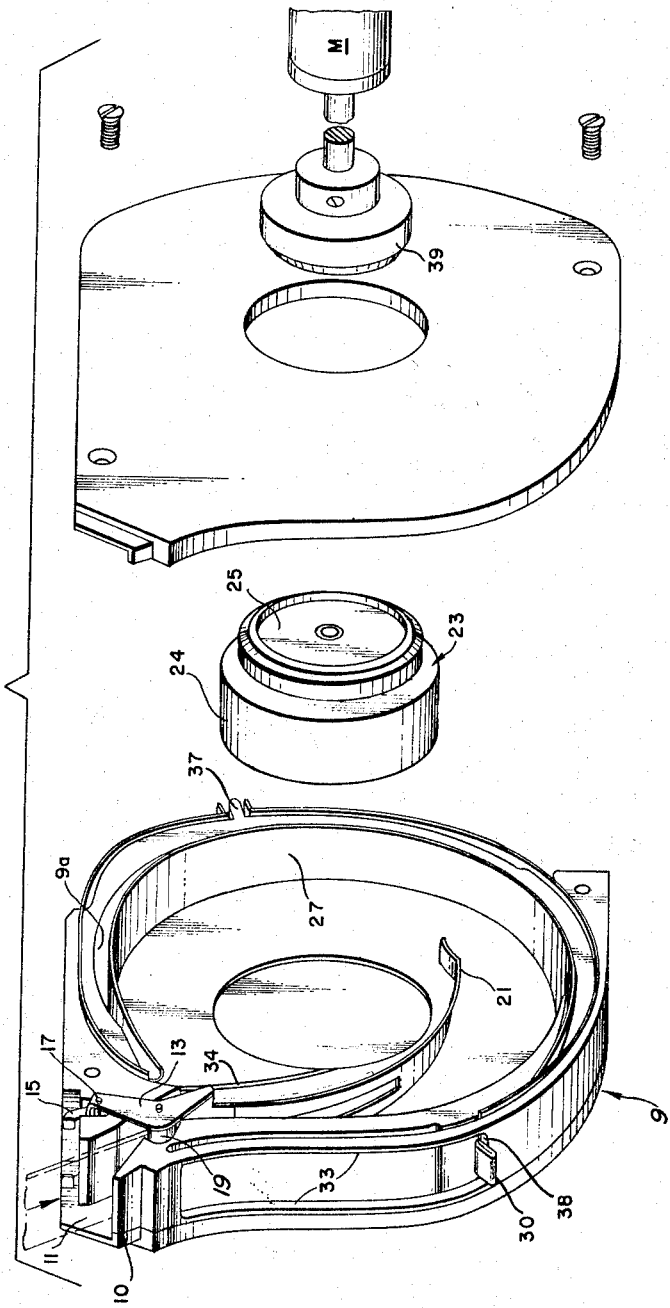
FIGURE 1 is an exploded perspective view of an embodiment of my invention.

The embodiment illustrated in FIGURES 1-4 inclusive comprise a cartridge casing 9, which may be made of a durable plastic material or of any material which economic considerations or specific circumstances may demand. An opening 11 is provided in the casing 9 for the passage of film into or out of the cartridge. A take-up core 23 serves to receive and wind the film when driven by driving means 39 in association with hub 25, hub 25 preferably being integral with core 23. Driving means 39 may be rotatably driven by a suitable motor M shown in FIGURE 1.

Figure 4:
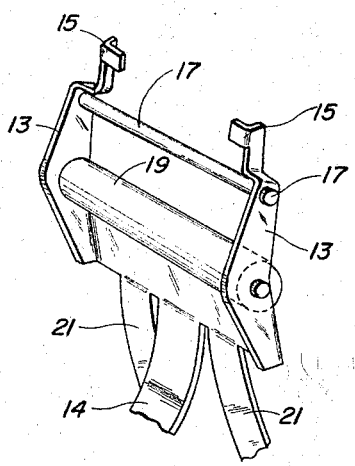
FIGURE 4 is an enlarged perspective view of the embodiment illustrated in FIGURE 1.

Cartridges of the nature of the embodiment of FIGURES 1–4 may be adapted to be used in conjunction with the photographing station of a microfilm copier to receive exposed film in light-tight relationship with the picture taking portion or film unit. Conveniently, a complimentary recess is usually provided in the film unit to receive the cartridge. The neck 10 comprising opening 11 is inserted into such a recess, and the cartridge is locked therein. Within the opening 11 are two bell cranks 13 pivoting on pivot pin 17, the bell cranks 13 being located, as illustrated in FIGURE 1, on opposite sides of the cartridge and rotatably supporting roller 19, as shown in FIGURE 4. The bell crank and roller assembly is spring biased by leaf spring 14 to urge roller 19 to a light-tight position within opening 11 when the cartridge is separated from the camera.

Figure 2:
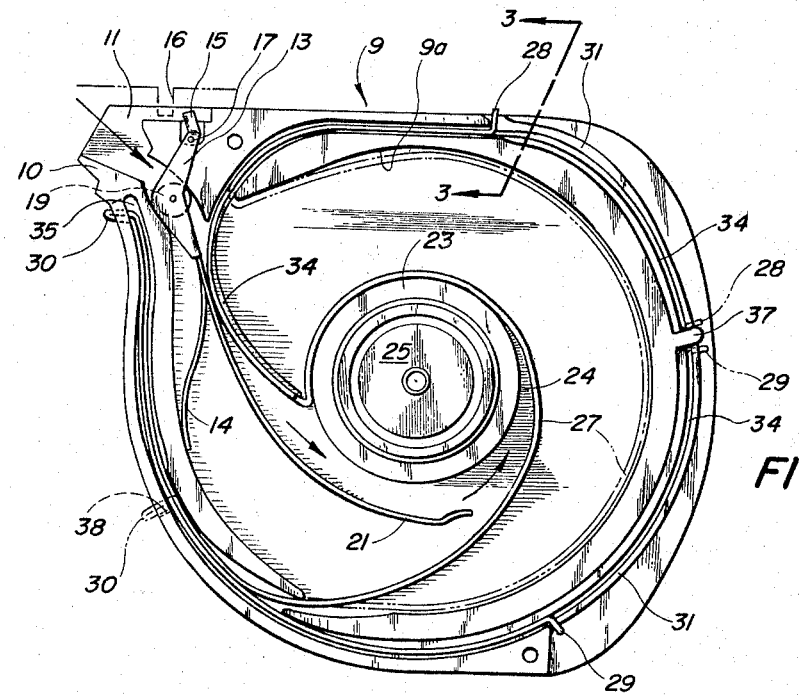
FIGURE 2 is a side view of the same with cover removed.
Figure 3:
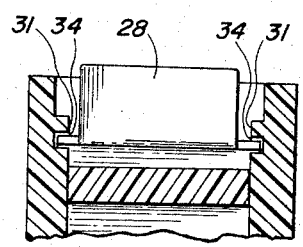
FIGURE 3 is an enlarged cross-sectional view taken along lines 3—3 of FIGURE 2.

Upon insertion of the cartridge into the complimentary recess within a film unit or camera, actuating member 15 is displaced to the right by a projection within the camera, such as projection 16 shown in FIGURE 2. Actuating member 15 is rigidly attached to bell cranks 13, and its displacement causes the bell crank and roller assembly to pivot clockwise about pins 17 to move roller 19 away from its light-sealing position within opening 11. Film may then be moved through opening 11 over the top of roller 19. Rotatably driven driving means 39 is adapted to couple with hub 25 to drive take-up core 23. Any mechanical coupling may be used, but the most appropriate would be a magnetic coupling, the hub 25 having, for example, metallic segments along its sides or a flat metal disk in the hub recess, the driving means 39 then comprising a rotatable magnetic material positioned adjacent the hub 25. By providing such magnetic coupling, the tension on the film may be maintained within a preselected maximum limit determined by the strength of the coupling, the core 23 ceasing to rotate when this limit is reached, while the driving means 39 continues to rotate. A further advantage of such a coupling is to reduce shock on the film when taking up slack.

Retractable guide 27 is preferably of a resilient steel material and is initially disposed within the cartridge in close proximity to a substantial portion of the surface 24 of take-up core 23, surface 24 having a relatively high coefficient of friction to assure good frictional engagement with the film. Retractable guide 27 is adapted to be moved within guide tracks 34 and 35. Tab members 28, 29 and 30 are affixed to the retractable guide 27, and slots 31 and 33 are provided within the casing 9 for their movement.

Retractable guide 27 may be pulled along guide track 34 by convergence of both tab members 28 and 29 towards abutment 37. Such action may be accomplished manually or mechanically and will result in the guide 27 being disposed adjacent the internal periphery 9a of casing 9, thus in the fully retracted position. The movement of tab members 28 and 29 toward abutment 37 also causes tab member 30, which is interconnected with tab member 29, to move toward abutment 38. Tab member 30 may serve as an interlock to operate a switch which will allow the camera to take pictures only when tab member 30 is adjacent abutment 38.

Retractable guide 27 could also serve as a tensioning device to assure uniform winding of the film on the core. The guide 27 would then desirably have a sufficiently low friction surface and be sufficiently flexible to allow the film to move it back towards the internal periphery 9a without scratching the surface of the film. Thus, it would not be necessary to mechanically move the tab members toward abutments 37 and 38.

Referring to FIGURES 1 and 2, the cartridge is inserted into a complimentary recess of a camera, and actuating member 15 is displaced by projection 16 to move roller 19 from its light-sealing position within opening 11. Driving means 39 is coupled to hub 25 and is adapted to rotate upon actuation of the camera drive motor. Film from the camera is driven over the top of roller 19 and moves as indicated by the arrows in FIGURE 2 between resilient guide member 21 and retractable guide 27, with guides 21 and 27 in the position shown in FIGURE 2. The free end of the film moves between retractable guide 27 and rotating core 23 and is frictionally engaged by surface 24 of core 23. When the free end of the film has wrapped around core 23 a sufficient number of times to assure a firm grip thereon, retractable guide 27 is moved back out of the way against the internal periphery 9a of casing 9 by the manual or mechanical movement of tab members 28 and 29 to abutment 37. Movement of tab member 30 to abutment 38 allows the picture taking sequence to begin. It is preferable that the driving means 39 be rotating at a speed sufficient to maintain tension on the film between core 23 and the photographing station. When a magnetic coupling is provided, a constant tension may be maintained, and the film may then be uniformly wound onto core 23.

As the film builds up on core 23, resilient guide member 21 is accordingly backed off toward the internal periphery 9a of casing 9 by the building up of the film on the core. Guide member 21 is sufficiently flexible that it is easily moved back so that it does not scratch the surface of the film. It may be desired to place a small roller at the end of guide member 21 to contact the film. In addition to serving as a guide, resilient guide member 21 maintains a slight braking action on the film and core, thus preventing the core from "clock springing" or rotating in reverse direction when the full cartridge is disengaged from the camera.

The cartridge is removed from the camera housing when the film has been wound onto core 23, and actuating member 15 is returned to its initial position due to the action of leaf spring 14 on bell cranks 13. Roller 19 then takes its initial position within opening 11, and the cartridge is sealed from light. It will now be apparent to those skilled in the art that the apparatus of the present invention provides a simple and reliable means for winding the free end of flexible strip material such as film. No manual attachment of the film to the takeup core is necessary, the film end being guided into the cartridge and around the core by itself.

The invention has been described in considerable detail with particular reference to certain preferred embodiments thereof, but it will be understood that variations and modifications can be effected within the spirit and scope of the invention as described hereinabove, and as defined in the appended claims.

I claim:

1. In a device for receiving and winding a flexible strip material, said device having a casing provided with an opening for the passage of the material thereinto and having a rotatably driven take-up core, the improvement comprising retractable guide means disposed adjacent said core for guiding the leading end of said strip material around said core, and means for retracting said retractable guide means away from said core when said strip material has been wound a sufficient number of times around said core to assure a firm grip thereon.

2. The invention in accordance with claim 1 and further comprising a spring biased second member adapted to co-operate with said retractable guide means for guiding said strip material into winding relation with said core.

3. The invention in accordance with claim 2 and wherein said second member is positioned to resiliently contact the outer periphery of the strip material as it is wound on said core, thereby improving uniformity of winding.

4. The invention in accordance with claim 1 and wherein said retractable guide means comprises a resilient member which is movable between a position closely adjacent to a substantial peripheral portion of the core surface, in which position the strip material is directed to wind upon itself and frictionally grip the core, and a retracted position in which the resilient member is located adjacent to the inner peripheral surface of the casing.

5. The invention in accordance with claim 4 and wherein:
    (a) said casing is provided with an abutment surface, and
    (b) said retracting means comprises actuating means having an abutment portion accessible from the exterior of the casing and engageable with said abutment surface for determining the retracted position of the retractable guide means upon engaging the abutment surface.

6. The invention in accordance with claim 5 and further comprising a roller assembly adjacent said opening, said roller assembly comprising a roller rotatably supported between two bell cranks pivotally supported adjacent to said opening, said bell cranks being spring biased to urge said roller into said opening, and means for overcoming the spring bias to selectively move said roller away from said opening, whereby said strip material moves over the surface of said roller in contact therewith during passage of said strip material into said casing.

7. The invention in accordance with claim 1 and wherein said retractable guide means is adapted to fit closely about a substantial peripheral portion of the core surface, thereby causing said strip material to wind tightly upon itself and frictionally grip the core after a minimum number of turns around the core.

8. The invention in accordance with claim 1 and wherein said retractable guide means comprises a resilient member movable by said retracting means to a position adjacent the inner peripheral surface of the casing.

9. The invention in accordance with claim 1 and wherein said casing is provided with an abutment surface and wherein said means for retracting comprises an abutment portion for locating the retracted position of said retractable guide means when said abutment portion is disposed adjacent said abutment surface.

10. The invention in accordance with claim 1 and wherein said means for retracting comprises an actuating means accessible from the exterior of said casing for retraction of said guide means.

11. The invention in accordance with claim 1 and further comprising a roller assembly adjacent said opening, said roller assembly comprising a roller rotatably supported between two bell cranks pivotally supported adjacent to said opening, said bell cranks being spring biased to urge said roller into said opening, and means for overcoming the spring bias to selectively move said roller away from said opening, whereby said strip material moves over the surface of said roller in contact therewith during passage of said strip material into said casing.

12. In a film cartridge for use with a photographic film camera for receiving and winding a photographic film being fed from said camera, said cartridge having a casing provided with an opening for the passage of said film thereinto and having a rotatably driven take-up core, and said film cartridge being adapted to be inserted into a complimentary recess in the camera in position to receive said film, the improvement comprising light-sealing means adjacent said opening comprising a roller rotatably supported between two bell cranks, said bell cranks being pivotally supported adjacent said opening and being spring biased to urge said roller in light-tight relationship with said opening when said cartridge is removed from said camera, means for pivoting said bell cranks to move said roller away from its light sealing position when said cartridge is inserted into said complimentary recess, said roller being thereupon positioned for passage of said film thereover in peripheral contact therewith, retractable guide means disposed adjacent said core for guiding the leading end of said film around said core, and means for retracting said retractable guide means away from said core when said film has been wound a sufficient number of times around said core to assure a firm grip thereon.

13. A device according to claim 12, the improvement further comprising a spring biased resilient guide member adapted to co-operate with said retractable guide means for guiding said film onto said core, said resilient guide member being positioned to resiliently contact the outer periphery of the film as it is wound onto said core, thereby improving uniformity of winding and inhibiting clock-springing.

References Cited
UNITED STATES PATENTS

| | | | |
|---|---|---|---|
| 999,679 | 8/1911 | Selig. | |
| 1,921,560 | 8/1933 | Case | 242—71.1 X |
| 2,662,696 | 12/1953 | Nerwin | 242—71.1 |
| 3,195,824 | 7/1965 | Laa et al. | 242—71.1 X |

FRANK J. COHEN, *Primary Examiner.*

N. L. MINTZ, *Examiner.*